United States Patent [19]
Jacobs et al.

[11] 3,759,955
[45] Sept. 18, 1973

[54] PROCESS FOR INHIBITING DIKETENE POLYMERIZATION

[75] Inventors: Max LeRoy Jacobs, Livermore, Colo.; Buster Watson Higdon, Pampa, Tex.

[73] Assignee: Celanese Corporation, New York, N.Y.

[22] Filed: Mar. 19, 1971

[21] Appl. No.: 126,301

Related U.S. Application Data

[63] Continuation of Ser. No. 628,835, April 6, 1967, abandoned.

[52] U.S. Cl. .............................................. 260/343.9
[51] Int. Cl. .............................................. C07d 3/00
[58] Field of Search ................................. 260/343.9

[56] References Cited
UNITED STATES PATENTS

| | | | |
|---|---|---|---|
| 2,019,983 | 11/1935 | Law | 260/343.9 |
| 3,392,174 | 7/1968 | Hildebrand | 260/343.9 |

FOREIGN PATENTS OR APPLICATIONS

| | | | |
|---|---|---|---|
| 904,341 | 8/1962 | Great Britain | 260/343.9 |

*Primary Examiner*—Alex Mazel
*Assistant Examiner*—Anne Marie T. Tighe

[57] ABSTRACT

A process for inhibiting the polymerization of diketene in storage which comprises adding water to the diketene in amounts of from about 0.001 to about 2 weight percent.

3 Claims, No Drawings

PROCESS FOR INHIBITING DIKETENE POLYMERIZATION

This is a streamline continuation of U.S. Pat. application Ser. No. 628,835, filed Apr. 6, 1967, and now abandoned.

BACKGROUND OF THE INVENTION

This invention relates to stabilized diketene and to a process for inhibiting the polymerization of diketene in storage.

Diketene is a very unstable compound which tends to polymerize when stored. Such polymerization destroys its usefulness in such areas as the pharmaceutical industry where it is used in the synthesis of drugs. Various attempts have been made in the past to minimize this polymerization of diketene but they have been either ineffective or have impaired the purity of the diketene which precludes its use in such areas as the drug industry. The methods used in the past to inhibit polymerization of diketene have included refrigeration, and adding boric acid or hydrosulfates of weak bases such as copper sulfate to the diketene. U. S. Pat. No. 3,271,420 to Zima discloses a method for stabilizing diketene by adding elemental sulphur to it. However, the sulphur remains in the diketene and must be removed by distillation or other methods if purity is important to the ultimate use of the diketene.

SUMMARY

It has now been found that the polymerization of diketene in storage may be inhibited without impairing its purity by adding water to the diketene in amounts of from about 0.001 to about 2 weight percent, based on the weight of the diketene.

Accordingly, it is an object of this invention to provide a process which is effective in inhibiting the polymerization of diketene in storage.

Another object of this invention is to provide a process which inhibits the polymerization of diketene but which requires no subsequent distillative procedures to insure the purity of the substance.

DESCRIPTION OF THE PREFERRED EMBODIMENT

Since the formation of polymers within diketene is accompanied by a change in the color of the substance, the darker color indicating a higher degree of polymerization, the maintenance of a lighter color in the diketene is evidence of the inhibitory effect of the water. While no particular conditions of temperature or pressure are necessary to insure this inhibiting effect, the water is particularly effective as an inhibitor at the temperatures at which diketene is normally stored, which is between 38° and 77°F.

Analysis of commercial diketene discloses a small percentage of acetic anhydride and acetic acid present therein as impurities. Where such impurities are present the acetic anhydride should be hydrolyzed to acetic acid by adding an equilibrium amount of water sufficient for this purpose to the diketene. The amount of water, necessary for inhibiting the polymerization of diketene, will generally be from about 0.001 to 2 weight percent, although preferably from about 0.5 to 2 weight percent. This inhibitory amount of water may be added in excess of the equilibrium amount necessary for the above described hydrolysis. The usual amount of acetic anhydride present within the diketene is from about 0.5 to 1.80 weight percent based on the total weight of the diketene material.

The water may be added to the diketene by any conventional means, however, it is preferable that the water be dispersed thoroughly throughout the diketene.

In the absence of indications to the contrary all proportions and concentrations of material are expressed herein on a weight basis.

The invention is additionally illustrated by the following examples:

EXAMPLE I

Diketene samples, to which 1% water was added, were stored in 5 gallon containers at 77° and 38°F, respectively, and allowed to stand for varying lengths of time.

The samples were periodically tested for color using platinumcobalt APHA (Hazen) color standards on a Beckman Model DU Spectrophotometer. The higher numbers represent a darker color which indicates increased polymerization of diketene. The data taken from the water inhibited sample was compared with a control sample containing no water. Results shown below in Tables I and II indicate a significant retardation of diketene polymerization in those samples containing 1 percent water as an inhibitor. The color of the blank or control sample was too dark to permit a numerical reading, which reflected an exceptionally high degree of diketene polymerization.

TABLE I (38° F.)

| | Days stored | | | | | |
|---|---|---|---|---|---|---|
| | 91 | 105 | 119 | 133 | 147 | 177 |
| | APHA color standards | | | | | |
| Control | Dark orange. | Dark orange. | Dark orange. | Dark orange. | Dark orange. | Dark orange. |
| 1% H₂O added | 45 | 60 | 70 | 120 | 120 | 120 |

TABLE II (77° F.)

| | Days stored | | | |
|---|---|---|---|---|
| | 21 | 28 | 35 | 42 |
| | APHA color standards | | | |
| Control | Dark orange. | Dark orange. | Dark orange. | Dark orange. |
| 1% H₂O added | 8 | 16 | 22 | 22 |

EXAMPLE II

A diketene sample assaying 95.96 percent diketene, 1.51 percent acetic acid and 1.10 percent acetic anhydride was mixed with an equilibrium amount of water so as to hydrolyze all of the acetic anhydride present therein. A 2 percent excess of water was then added to the diketene and the mixture stored in aluminum containers at 77°F. Color tests were taken after 3 and 10 days. The standard color tests described in Example I were also used in this experiment. The resulting data shown below in Table III indicates that the addition of a small percentage of water inhibits the polymerization of diketene when the acetic anhydride present in the diketene is first hydrolyzed to acetic acid.

TABLE III(77°F)

| Days stored | Apha Color | Standards |
|---|---|---|
| Acetic anhydride hydrolyzed + 2% excess H$_2$O | 3 5 | 10 32 |
| Control | 6 | 600 |

The principle, preferred embodiment, and mode of operation of the present invention has been described in the foregoing specification.

What is claimed is:

The embodiments of the invention in which an exclusive property or privilege is claimed are defined as follows:

1. A method for inhibiting the polymerization of diketene in storage which consists of incorporating water into said diketene in an amount stoichiometrically sufficient to hydrolyze any acetic anhydride contained in said diketene and to provide, in addition, an excess of water amounting to about 0.001 percent to about 2 percent by weight based on the weight of the diketene.

2. The method of claim 1 wherein the diketene before addition of the water contains from about 0.5 to about 1.8 percent of acetic anhydride by weight.

3. The method of claim 2 wherein the diketene is maintained at a temperature between about 38°F and about 77°F.

* * * * *